United States Patent Office 3,803,238
Patented Apr. 9, 1974

3,803,238
PROCESS FOR THE PREPARATION OF SECONDARY AMINES
Alfred Struve, Monheim, Wilfried Umbach, Langenfeld, and Werner Stein, Erkrath-Unterbach, Germany, assignors to Henkel & Cie GmbH, Dusseldorf-Holthausen, Germany
No Drawing. Filed July 28, 1971, Ser. No. 167,045
Claims priority, application Germany, July 31, 1970, P 20 38 104.8
Int. Cl. C07c 93/04
U.S. Cl. 260—584 B     5 Claims

ABSTRACT OF THE DISCLOSURE

A process for the preparation of amines consisting essentially of the steps of reacting secondary alcohols selected from the group consisting of alkanols and cycloalkanols with alkylene oxides having from 2 to 4 carbon atoms in a mol ratio of from 1:1 to 1:10, in the presence of a Lewis acid alkoxylation catalyst, sulfating the alkoxylation mixture obtained, subjecting the sulfated alkoxylation mixture to aminolysis and recovering said amines from secondary alcohols.

The prior art

It has been known that sulfates of primary alcohols can be converted to amines by reaction with ammonia or amines. Thus, for example, the aminolysis of such sulfates with dimethylamine, methylamine or ammonia gives in a yield of about 90% dimethylalkylamines, methylalkylamines or alkylamines as well as dialkylamines. If, however, sulfates of secondary alcohols are aminolyzed, a considerable reduction in yield occurs in that, in the first place, the starting alcohols is reformed and secondly, as a by-product an olefin with the chain length of the starting alcohol is formed, according to the following reaction scheme

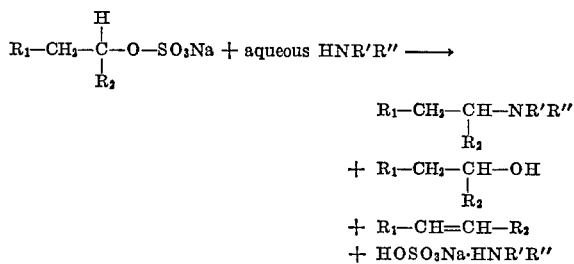

These side reactions occur in increased proportions if the sulfate group in the sulfate, to be aminolyzed, is not in the 2-position of the alkyl chain. It is known that the other non-terminal secondary positions differ in their reactivity substantially from the 2-position. This becomes clear from the following experimental results of the aminolysis of various secondary alkyl sulfates that were conducted under customary aminolysis conditions at 170° to 180° C. and reported in Table I.

TABLE I

| Secondary alkyl sulfate | Amine used | End product content of— | |
|---|---|---|---|
| | | Starting alcohol, percent | Olefin, percent |
| Octyl-2 sulfate | HN(CH₃)₂ | 10 | 14 |
| Do | H₂NCH₃ | 7 | 15 |
| Do | NH₃ | 15 | 20 |
| Decyl-4 sulfate | HN(CH₃)₂ | 8 | 63 |
| Cyclododecyl sulfate | HN(CH₃)₂ | 2 | 80 |

The difference in the reactivity of the secondary alkyl sulfates, isomeric in regard to the position of the sulfate group, becomes particularly critical, in respect to the preparation of amines from these raw materials, in the case in which, for example, secondary alcohols derived by paraffin oxidation are used as a basis of the synthesis. In the case of the use of the corresponding sulfates, mixtures of substances with approximately statistical distribution of the sulfate group are present. Such sulfates would have approximately the reactivity of the decyl-4 sulfate, given in the above Table I as an example and in the aminolysis, the results would be about the same.

Objects of the invention

An object of the invention is to develop a process for the production of amines from secondary alcohols with a lower amount of byproducts.

Another object of the invention is the development of a process for the preparation of amines from secondary alcohols which consists essentially of reacting secondary alcohols selected from the group consisting of alkanols having 3 to 24 carbon atoms and cycloalkanols having 6 to 12 carbon atoms with an alkylene oxide of the formula $$R-CH-CH_2$$
$$\diagdown O \diagup$$

wherein R is a member selected from the group consisting of hydrogen, methyl, methylol and ethyl, in a mol ratio of from 1:1 to 1:10, in the presence of a Lewis acid alkoxylation catalyst under alkoxylation conditions, sulfating the alkoxylation mixture obtained with at least a molecular equivalent of a sulfating agent stronger than concentrated sulfuric acid, subjecting the resultant sulfated alkoxylated mixture to aminolysis with an excess of amine of the formulae $$HNR'R'', \quad R'R''N(CH_2)_nNR'R''$$

or

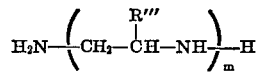

wherein R' and R'' are members selected from the group consisting of hydrogen, alkyl having from 1 to 24 carbon atoms, cycloalkyl having from 6 to 12 carbon atoms and alkylol having from 2 to 4 carbon atoms, R''' is a member selected from the group consisting of hydrogen and alkyl having 1 to 2 carbon atoms, $n$ is an integer of from 2 to 12 and $m$ is an integer from 2 to 5, at a temperature between 100° C. and 200° C., and recovering said amines from secondary alcohols.

These and other objects of the invention will become more apparent as the description thereof proceeds.

Description of the invention

It was now surprisingly found, that amines can be prepared from secondary alcohols in high yields, if these alcohols or alcohol mixtures are reacted before sulfation with alkylene oxides and the corresponding ether sulfates are subsequently aminolyzed in a conventional way.

It is the problem of the invention to develop, based on this knowledge, a technically usable process for the preparation of amines from secondary alcohols.

The problem is solved, according to the invention, in that as starting substances for the aminolysis products are used, that are obtained as mixtures of compounds by the addition of alkylene oxides to secondary alcohols under catalysis with Lewis acids and subsequent sulfation of the alkoxylation mixture.

According to the invention a process for the preparation of amines from secondary alcohols has been discovered which is characterized in that secondary alcohols are reacted in the presence of Lewis acids with alkylene oxides containing 2 to 4 carbon atoms, in the mol ratio of 1:1 to 1:10, the obtained alkoxylation mixture is sulfated, and the sulfation products are aminolyzed.

Suitable alkoxylation catalysts are Lewis acids, such as $BF_3$, $SbCl_5$, and particularly the oxonium salts, carboxonium salts and carbonium salts, described as alkoxylation catalysts in copending commonly-assigned U.S. patent applications Ser. Nos. 859,560 and 859,581, filed Sept. 19, 1969. Ser. No. 859,560 has issued as Pat. No. 3,651,152 and Ser. No. 859,581 has been abandoned. As examples for such alkoxylation catalysts are the following:

Trimethyloxonium tetrafluoroborate,
triethyloxonium tetrafluoroborate,
triethyloxonium hexachloroantimonate,
1-ethyl-1-oxacyclopentanium hexachloroantimonate,
tributyloxonium hexachloroantimonate,
1-(4-chlorobutyl)-1-oxa-cyclopentanium hexachloroantimonate,
trimethyloxonium tetrachloroferrate,
trimethyloxonium tetrachloroaluminate,
triethyloxonium tetrachloroaluminate,
bis-(trimethyloxonium)hexachlorostannate,
triphenyloxonium tetrafluoroborate,
O-ethylcampheroxonium tetrafluoroborate,
2-ethoxy-1-oxa-cyclopent-1-enium tetrafluoroborate,
O-ethyldibenzalacetonium tetrachloroaluminate,
triethylcarbonate-acidium tetrafluoroborate,
O-ethyldimethylformimidium tetrafluoroborate,
2-ethoxy-1-thia-cyclopent-1-enium tetrafluoroborate,
1-methyl-2-ethoxy-1-aza-cyclopent-1-enium tetrafluoroborate,
2,3-benzo-6-ethoxy-pyrylium tetrafluoroborate,
2-methyl-1,3-dioxolenium tetrafluoroborate,
2-phenyl-1,3-dioxolenium hexachloroantimonate,
2-ethoxy-1-oxa-cyclotridec-1-enium tetrafluoroborate,
dimethoxycarbonium tetrafluoroborate,
diethoxycarbonium tetrafluoroborate,
methoxyethoxycarbonium tetrafluoroborate,
dibutoxycarbonium hexafluoroantimonate,
diisopentoxycarbonium hexachloroantimonate,
tropylium tetrafluoroborate,
triphenylmethyl tetrafluoroborate,
tris-p-biphenylmethyl tetrafluoroborate.

As starting alcohols for the alkoxylation reaction, aliphatic and/or cycloaliphatic alcohols with particularly 3 to 24 or 6 to 12 carbon atoms such as secondary alkanols having 3 to 24 carbon atoms and cycloalkanols having 6 to 12 carbon atoms may be used, for example, propanol-(2), butanol-(2), pentanol-(2), pentanol-(3), heptanol-(2), 2,4-dimethylpentanol-(3), nonanol-(2), nonanol-(5), undecanol-(2), pentadecanol-(2), 3,8-diethyltridecanol-(6), 7-methyl-9-hexylheptadecanol-(11), cyclohexanol, cyclododecanol.

The alcohols may also be used in a mixture with each other. The invention process is of particular advantage in the processing of homologous mixtures of secondary alcohols, as they are obtained by the air oxidation of paraffins in the presence of boron containing compounds, such as boric acid, boron trioxide, borates, boric acid esters or also of other absorption reagents for the formation of secondary alcohols known in the literature, such as arsenic aciid, arsenic acid esters, arsenic trioxide and others.

Of course, also mixtures of secondary with primary alcohols, as they may be obtained, for instance, by the hydrogenation of epoxides, may be used as starting substances.

As alkylene oxides, optionally substituted epoxides with 2 to 4 carbon atoms may be used, particularly those of the formula

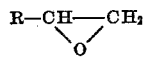

wherein R is hydrogen, methyl, methylol or ethyl, such as ethylene oxide, propylene oxide, butylene oxide or glycide.

The alkylene oxides may be added to the secondary alcohols alone, in mixtures with each other or in multistage successive additions. The alkoxylation may be executed under conventional conditions. In the use of the alkoxylation catalysts, named as preferred, temperatures between 70° and 80° C. have been proven as particularly advantageous. The amount of Lewis acid alkoxylation catalysts employed can vary from 0.05% to 5% by weight based on the total reaction mixture. Normal or elevated pressures may be employed. The amount of alkylene oxide to be added, is preferably 2 to 4 mols per mol of alcohol utilized.

When the preferred catalylsts are utilized, the alkoxylated secondary alcohols are preferably sulfated as mixtures without further purification. The sulfation of the alkoxylation mixtures can be carried out in a known manner with customary sulfating agents, preferably those stronger than concentrated sulfuric acid, such as, for example, $SO_3$ and $SO_3$-air mixtures, $SO_3$-adducts or chlorosulfonic acid. The sulfating agent is advantageously used in a slight excess over the stoichiometrically required amount, which may amount to about 1% to 15%.

The sulfation is carried out at temperatures of from 0 to 40° C., preferably 10° to 30° C. No processing of the sulfation mixture before the neutralization and subsequent treatment by aminolysis is required.

The aminolysis of the obtained sulfation mixtures may be carried out as usual with ammonia, primary and/or secondary aliphatic and/or cycloaliphatic mono-, di- and/or polyamines. Preferably these amines have the formulae $$HNR'R'', \quad R'R''N(CH_2)_nNR'R''$$

and

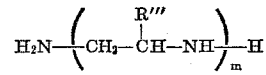

wherein R' and R'' are members selected from the group consisting of hydrogen, alkyl having from 1 to 24 carbon atoms, cycloalkyl having from 6 to 12 carbon atoms and alkylol having from 2 to 4 carbon atoms, R''' is a member selected from the group consisting of hydrogen and alkyl having 1 to 2 carbon atoms, n is an integer from 2 to 12 and m is an integer from 2 to 55. Examples of such amines are methylamine, dimethylamine, monoethylamine, diethylamine, mono- and dipropylamine, mono- and dibutylamine, methylethylamine, hexylamine, higher fatty amines or fatty amine mixtures of fatty acids of natural origin, cyclohexylamine, cyclododecylamine, alkoxylation products of ammonia, such as ethanolamine, diethanolamine, isopropanolamine, α, ω-diamines, such as ethylene diamine, dodecamethylenediamine-(1,12), polyamines, such as diethylene triamine, dipropylenetriamine, triethylenetetramine, tetraethylenepentamine. Preferably the aminolysis is carried out with ammonia, lower alkyl amines with 1 to 4 carbon atoms in the alkyl radicals as well as with α,ω-alkylenediamines with 2 to 12 carbon atoms.

The aminolysis of the sulfation mixture, neutralized with alkali metal or alkaline earth metal bases, can be executed in a known manner. The secondary alkylsulfates are, for this purpose, dissolved in an adequate amount of water and heated with an excess of amine which amounts to about 1.5 to 25 times the molar amount of secondary alkyl sulfate, to temperatures between 100° and 200° C. Temperatures between 150° and 190° C. are preferred. If amines are used for the aminolysis whose boiling point is below that of the respective reaction temperature, the reaction is carried out under pressure.

After the termination of the reaction, the two phases formed during the reaction are separated and the organic phase is worked up by fractional distillation. In addition to excess amine used for the aminolysis, the organic phase contains as by-products, small amounts of oxygen-free amines, secondary alkanol and olefins with the chain length of the alkanol.

The products of the process are valuable intermediaries for organic syntheses, particularly for the preparation of quaternary salts and detergents. Such detergents can be obtained from the products of the process by oxidation with per-compounds, optionally after a preceding repeated alkoxylation of the aminolysis products. The products of the process can also be used as flotation agents, binders for road-building materials, emulsifiers in polymerization processes and as additives for lubrication oils. The said products offer a particular advantage in the possibility of balancing of alkyl chain length and alkylene oxide content to stress respectively the hydrophilic or hydrophobic character of the compounds.

The following specific embodiments are illustrative of the practice of the invention without being limitative in any respect.

EXAMPLES

In the following examples, sulfated products of the following alkoxylation mixtures were used as starting substances:

(A) Addition product of 2 mols of ethylene oxide to 1 mol of a secondary $C_{14}$ alcohol derived by paraffin oxidation; alkoxylation catalyst: 0.3% by weight (based on the end product) of triphenylcarbonium tetrafluoroborate. Reaction conditions: 75° to 80° C., normal pressure.

(B) Addition product of 2 mols of ethylene oxide to one mol of a secondary $C_{14}$ alcohol derived by paraffin oxidation; alkoxylation catalyst: 0.4% by weight (based on the end product) of triethyloxonium tetrafluoroborate. Reaction conditions: 72° to 78° C., normal pressure.

(C) Addition product of 2 mols of ethylene oxide to one mol of secondary $C_{14}$ alcohol derived by paraffin oxidation; alkoxylation catalyst: 0.3% by weight (based on the end product) of boron trifluoride. Reaction conditions: 50° C., normal pressure.

(D) Addition product of 2 mols of ethylene oxide to 1 mol of octanol-2; alkoxylation catalyst: 0.4% by weight (based on the end product) of triethyloxonium tetrafluoroborate. Reaction conditions: 72° to 80° C., normal pressure.

(E) Addition product of 2 mols of ethylene oxide to 1 mol of octanol-2; alkoxylation catalyst: 0.3% by weight (based on the end product) of boron trifluoride. Reaction conditions: 50° C., normal pressure.

(F) Addition product of 1.9 mols of propylene oxide to 1 mol of secondary $C_{14}$ to $C_{15}$ alcohol derived by paraffin oxidation; alkoxylation catalyst: 0.3% by weight (based on the end product) of triethyloxonium tetrafluoroborate. Reaction conditions: 72° to 80° C., normal pressure.

(G) Addition products of 4 mols of ethylene oxide to 1 mol of secondary $C_{11}$ to $C_{18}$ alcohol derived by paraffin oxidation; alkoxylation catalyst: 0.3% by weight (based on the end product) of triethyloxonium tetrafluoroborate. Reaction conditions: 70° to 75° C., normal pressure.

(H) Addition product of 2 mols of ethylene oxide to 1 mol of cyclododecanol; alkoxylation catalyst: 0.3% by weight (based on the end product) of triethyloxonium tetrafluoroborate. Reaction conditions: 70° to 76° C., normal pressure.

The alkoxylation mixtures A to H were sulfated at 15° to 25° C. with a 10% excess above the stoichiometric amount of chlorosulfonic acid. The sulfation mixture was neutralized with sodium hydroxide and converted to a 35 to 40% solution.

The aminolysis was carried out with the below listed ammonia and alkylamines, as follows: Each time 0.25 mol of sulfation product in the form of the 35 to 40% aqueous solution were charged with 250 ml. of water, and each time about 2 mols of the respective amine into an autoclave, and heated for 5 hours to 170° C. The contents of the autoclave were extracted with ether, the ether phase dried with sodium sulfate and evaporated. From the evaporation residue, the alcohol and the olefin and for the most part also the oxygen-free amine were distilled off as the most volatile components. For the determination of the content of the re-formed alcohol and of the olefin with the chain length of the alkanol, which are a direct measure for the degree of reaction attainable in the aminolysis with the process, the distillate was dissolved in a 4:1 methanol/ether mixture and passed over an acid cationic exchange resin (Lewatit SP 100), in order to bind all amine. The eluate was evaporated to remove the solvent, and the hydroxyl and iodine values were determined on the residue after evaporating, from which the content of alcohol and olefin in the total aminolysate was calculated.

In the case of the aminolysis of the sulfated alkoxylation product G the olefin and alcohol content were determined from the iodine value on hydrogenation and the hydroxyl value of the crude aminolysate.

The test results are summarized in the following Table II.

TABLE II

| Example number: | Sulfated alkoxylate (Na-salt) | Amine used | By-products in percent by weight | |
|---|---|---|---|---|
| | | | Olefin | Alcohol |
| 1 | A | $HN(CH_3)_2$ | 10.9 | 3.2 |
| 2 | B | $HN(CH_3)_2$ | 9.6 | 4.0 |
| 3 | C | $HN(CH_3)_2$ | 15.5 | 6.8 |
| 4 | A | $H_2NCH_3$ | 11.8 | 5.6 |
| 5 | A | $NH_3$ | 15.1 | 3.9 |
| 6 | B | $H_2N(CH_2)_3CH_3$ | 9.3 | 4.6 |
| 7 | B | $H_2N(CH_2)_2NH_2$ | 11.2 | 3.0 |
| 8 | D | $HN(CH_3)_2$ | 7.4 | 6.1 |
| 9 | E | $HN(CH_3)_2$ | 5.6 | 4.5 |
| 10 | F | $HN(CH_3)_2$ | 10.6 | 5.0 |
| 11 | G | $HN(CH_3)_2$ | 4.2 | 6.2 |
| 12 | H | $HN(CH_3)_2$ | 14.9 | 3.2 |

Comparison experiments

The secondary $C_{14}$ alcohol derived by paraffin oxidation, which forms the basis for the alkoxylation mixture A, was reacted in the presence of 0.2% by weight, based on the end product of sodium, added in the form of sodium, methylate, with ethylene oxide in the molar ratio 1:2, at 140° C. and 9 atm. The alkoxylation product was sulfated, as described for Examples 1 to 12, and reacted with the below-named amines. The determination of the byproduct content was done according to the method, given for Examples 1 to 10 and 12.

The following results were obtained:

TABLE III

| | By-products in percent by weight | |
|---|---|---|
| | Olefin | Alcohol |
| Amine used: | | |
| $HN(CH_3)_2$ | 34.5 | 10.4 |
| $H_2NCH_3$ | 37.5 | 11.0 |
| $NH_3$ | 43.2 | 13.0 |
| $H_2N(CH_2)_2NH_2$ | 31.2 | 7.6 |

These results make clear the substantially reduced formation of by-products in the case of the alkoxylation products, obtained in the presence of Lewis catalysts, used as starting substances, according to Examples 1 to 12.

The advantages, obtainable by the invention, consist particularly in that secondary alcohols, above all also those in which the OH-group is not in the 2-position, can be transformed to amines with substantially reduced formation of by-products. Hereby a new source for raw materials for a technically important class of substances has been disclosed, which has a special economical interest in view of the homologous mixtures of secondary alcohols, obtainable by oxidation of paraffins.

The preceding specific embodiments are illustrative of the practice of the invention. It is to be understood, however, that other expedients known to those skilled in the art or disclosed herein, may be employed without departing from the spirit of the invention or the scope of the appended claims.

We claim:
1. A process for the preparation of amines from secondary alcohols which consists essentially of reacting secondary alcohols selected from the group consisting of secondary alkanols having 3 to 24 carbon atoms and cycloalkanols having 6 to 12 carbon atoms with an alkylene of the formula

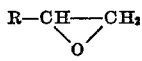

wherein R is a member selected from the group consisting of hydrogen, methyl, methylol and ethyl, in a mol ratio of from 1:1 to 1:10, in the presence of a Lewis acid alkoxylation catalyst selected from the group consisting of tertiary oxonium salts, carboxonium salts and carbonium salts under alkoxylation conditions, sulfating the alkoxylation mixture of compounds obtained with at least a molecular equivalent of a sulfating agent stronger than concentrated sulfuric acid, neutralizing the resultant sulfated alkoxylated mixture of compounds, subjecting the resultant neutralized sulfated alkoxylated mixture of compounds to aminolysis with an amine of the formulae

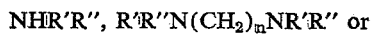

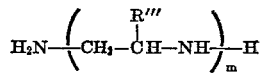

wherein R' and R'' are members selected from the group consisting of hydrogen, alkyl having from 1 to 24 carbon atoms, cycloalkyl having from 6 to 12 carbon atoms and alkylol having from 2 to 4 carbon atoms, R''' is a member selected from the group consisting of hydrogen and alkyl having 1 to 2 carbon atoms, $n$ is an integer of from 2 to 12 and $m$ is an integer from 2 to 5, at a temperature between 100° C. and 200° C., and recovering said amines from secondary alcohols without intermediate purification.

2. The process of claim 1 wherein said Lewis acid alkoxylation catalyst is a tertiary oxonium salt.

3. The process of claim 1 wherein said secondary alcohols are homologous mixtures of secondary alkanols obtained by oxidation of paraffins.

4. The process of claim 1 wherein said secondary alcohols and said alkylene oxides are reacted in a molar ratio of 1:2 to 1:4.

5. The process of claim 1 wherein said amine is utilized in an excess of 1.5 to 25 times the molar amount of said sulfated alkoxylated mixture.

References Cited
UNITED STATES PATENTS 3,651,152   3/1972   Umbach et al. ___ 260—615 B X
2,717,270   9/1955   Bindler _____ 260—584 B
3,287,410   11/1966  Dudzinski et al. ___ 260—583 R ELBERT L. ROBERTS, Primary Examiner R. L. RAYMOND, Assistant Examiner U.S. Cl. X.R.

260— 563 R, 584 C, 585 R, 615 B